(12) United States Patent
Kumar

(10) Patent No.: US 7,246,787 B2
(45) Date of Patent: Jul. 24, 2007

(54) SOLENOID VALVE ASSEMBLY

(76) Inventor: Viraraghavan S. Kumar, 1416 Dorset Pl., Melbourne, FL (US) 32940

( * ) Notice: Subject to any disclaimer, the term of this patent is extended or adjusted under 35 U.S.C. 154(b) by 20 days.

(21) Appl. No.: 11/014,345

(22) Filed: Dec. 16, 2004

(65) Prior Publication Data

US 2005/0145813 A1 Jul. 7, 2005

Related U.S. Application Data

(60) Provisional application No. 60/531,144, filed on Dec. 19, 2003.

(51) Int. Cl.
*F16K 31/02* (2006.01)
(52) U.S. Cl. .................... 251/129.07; 251/282
(58) Field of Classification Search ........... 251/129.07, 251/282
See application file for complete search history.

(56) References Cited

U.S. PATENT DOCUMENTS

| | | | |
|---|---|---|---|
| 4,936,337 A | 6/1990 | DuHack | 137/329.04 |
| 5,179,970 A | 1/1993 | Jarocki et al. | 137/9 |
| 5,228,597 A | 7/1993 | Low | 222/129.1 |
| 5,464,191 A | 11/1995 | Shenk | 251/129.21 |
| 5,565,832 A * | 10/1996 | Haller et al. | 335/249 |
| 5,639,066 A * | 6/1997 | Lambert et al. | 251/282 |
| 5,655,746 A | 8/1997 | Goubely et al. | 251/129.15 |
| 5,738,142 A | 4/1998 | Eike et al. | 137/596.17 |
| 5,785,299 A | 7/1998 | Katsuta et al. | 251/129.18 |
| 5,975,486 A | 11/1999 | Dettmann | 251/30.02 |
| 6,161,572 A | 12/2000 | Credle et al. | 137/504 |
| 6,199,823 B1 | 3/2001 | Dahlgren et al. | 251/117 |
| 6,209,580 B1 | 4/2001 | Foster | 137/596.12 |
| 6,223,761 B1 | 5/2001 | Najmolhoda et al. | 137/14 |
| 6,311,947 B1 | 11/2001 | Foster | 251/43 |
| 6,367,766 B1 | 4/2002 | Briant et al. | 251/129.02 |
| 6,422,533 B1 | 7/2002 | Harms | 251/129.1 |
| 6,666,231 B2 | 12/2003 | Entwistle | 137/625.65 |

* cited by examiner

*Primary Examiner*—Eric Keasel
*Assistant Examiner*—John K. Fristoe, Jr.
(74) *Attorney, Agent, or Firm*—The Bilicki Law Firm, P.C.

(57) ABSTRACT

A valve assembly comprised of a solenoid coil, having a coil bore, and being operative to produce a magnetic field when subject to an electric signal, a fixed magnetic pole piece within the coil bore, a generally cylindrically and axially translatable armature with a disc-shaped portion and an aperture therethrough, a valve base with a fixed portion over which the armature fits and forming a fluid cavity therebetween. The armature aperture allows a fluid to pass through the disc-shaped portion and into the fluid cavity to substantially equilibrate the fluid pressure on the armature in an axial direction. The valve assembly further includes a solenoid base which forms a chamber around the armature and a biasing mechanism between the magnetic pole piece and the armature which axially translates when the magnetic pole piece is subject to the electric signal, allowing the fluid to pass through the valve assembly in proportion to the electric current.

25 Claims, 5 Drawing Sheets

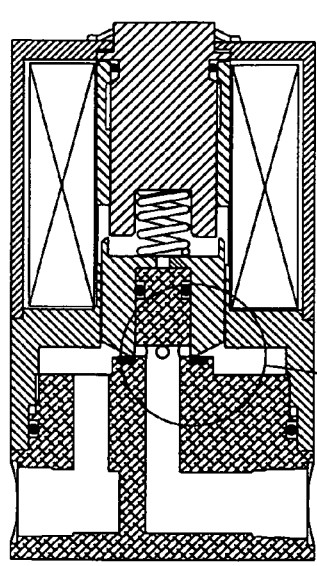
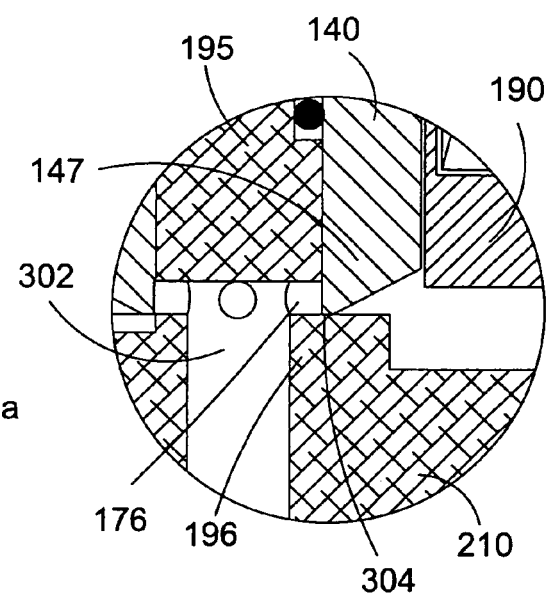
Fig. 5  Fig. 5a
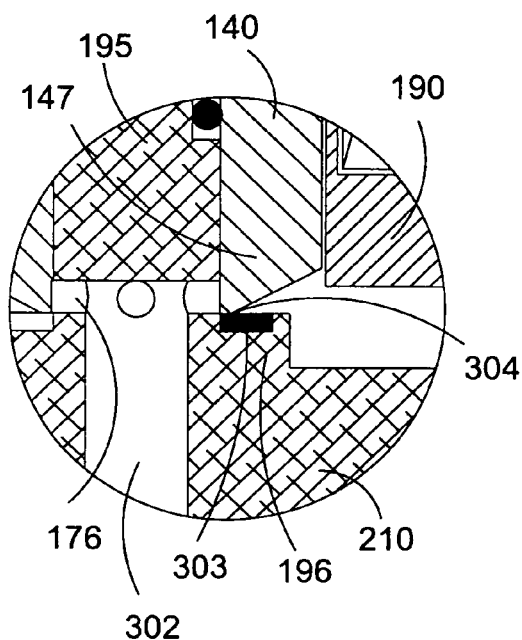
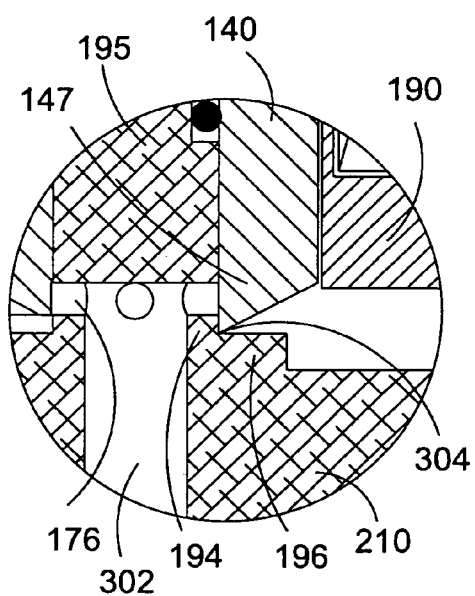
Fig. 5b  Fig. 5c

SOLENOID VALVE ASSEMBLY

CROSS-REFERENCE TO RELATED APPLICATIONS

This application claims priority under 35 U.S.C. §119(e) to U.S. provisional application Ser. No. 60/531,144 filed on Dec. 19, 2003, which is incorporated herein in its entirety.

FIELD OF INVENTION

This invention relates generally to proportional solenoid-controlled fluid valves. More particularly, but not by way of limitation, the invention relates to a fluid valve assembly that nearly equilibrates the upward and downward force of a fluid on an armature so that the force acting on the armature is essentially only that of a biasing member.

BRIEF DESCRIPTION OF THE DRAWINGS

FIG. 5 shows that portion of the valve assembly enlarged in FIGS. 5a through 5c.

FIGS. 5a, 5b, and 5c show alternate embodiments of the fluid seal junction.

DETAILED DESCRIPTION OF EMBODIMENTS OF THE INVENTION

Figure 1:
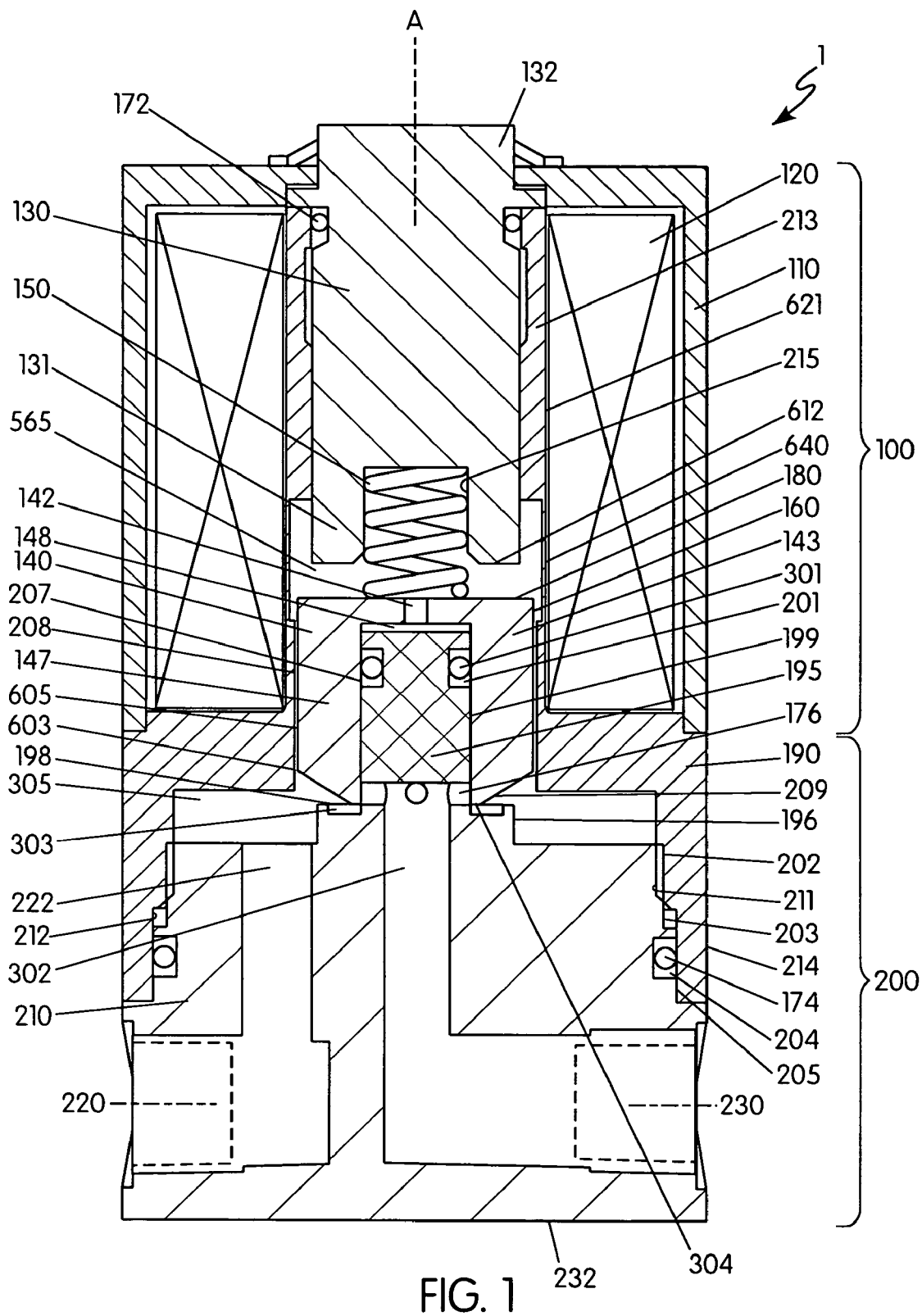
FIG. 1 shows one embodiment of the entire valve assembly.

While the valve is susceptible to various alternative forms and modifications, specific embodiments will be shown by way of example in the drawings and will be described in detail herein. However, it should be understood that the invention is not intended to be limited to the particular embodiments disclosed. Rather, it is intended that the invention covers all modifications, equivalents, and alternatives following within the spirit and scope of the invention as defined by the claims.

Furthermore, with reference to the drawings, the reader should understand that like reference numerals in different drawings refer to the like elements and components of the invention. Moreover, it should be noted that each embodiment of the invention is not depicted by the figures.

The term "fluid" is used herein to describe any substance with a flow capable of being controlled by a valve, be it a gas or liquid.

Valve assembly 1 is generally comprised of solenoid portion 100 and valve portion 200. Solenoid portion is generally comprised of housing 110, solenoid coil 120 disposed within housing 110 and with a generally cylindrical bore, magnetic pole piece 130 disposed substantially within the bore of solenoid coil 120, axially translatable armature 140, biasing member 150 between armature 140 and pole piece 130, and solenoid base 190 extending from within the bore of solenoid coil 120 and substantially into valve portion 200 and forms interior valve cavity 305 substantially around armature 140. In alternate embodiments, valve assembly 1 need not include housing 110 and/or can further include a bobbin (not shown) onto which said coil is wound, said bobbin being made of a non-magnetic material. Valve portion 200 is generally comprised of valve base 210 with fluid inlet port 220 and fluid exit port 230. The respective components and elements are generally symmetric about an axis of symmetry A.

The embodiment of armature 140 shown in FIG. 1 has generally disc-shaped portion 143 having top surface 180 and a generally annular ring 147 having an interior bore 207 and exterior cylindrical surface 160. Aperture 142 is formed on disc-shaped portion 143 of armature 140, thus making a fluid passage between the external portion and the interior bore 207 of the armature 140. Angular portion 209 of armature 140 extends from exterior cylindrical surface 160 of armature 140 at an opposite end away from surface 180 and connects to interior bore 207 of armature 140 through sealing surface 304. Armature 140 is made of a ferromagnetic material.

Valve portion 200 includes a generally cylindrical base member 210 having fluid input port 220 and fluid exit port 230, which are, in the embodiment shown, threaded so as to facilitate their being coupled to respective sections of fluid conduit (not shown). Interior valve cavity 305 is connected to fluid inlet port 220 by way of bore 222 therebetween. Valve base 210 has generally cylindrical second fixed portion 196 protruding from base member 210, forming surface 198 and generally cylindrical first fixed portion 195 protruding from second fixed portion 196. Outer surface 199 of first fixed portion 195 further includes groove 201 to accommodate sealing member 301. In this embodiment, sealing member 301 is an O-Ring. At least one aperture 176 is formed in first fixed portion 195 in proximity to the junction between surface 198 of first fixed portion and outer surface 199 of second fixed portion 196.

As an alternate embodiment, at least one aperture 176 can be replaced with a plurality of slots on cylindrical surface 199. At least one aperture 176 is connected to outlet port 230 by the way of bore 302. Valve base 210, which is of general cylindrical nature, has external stepped cylindrical surfaces 203 and 205 concentric with external cylindrical surface 214 of valve base 210. External threads 202 are located at the junction of valve base 210 and solenoid base 190. External groove 204 is formed on surface 205 of valve base 210 to receive sealing member 174. Also, in this embodiment, sealing member 303 is fitted into a circular groove formed in surface 198 of second fixed portion 196, to provide a fluid seal junction between armature 140 and second fixed portion 196. Sealing member 303 is made of any elastomeric material to facilitate a tight seal junction between sealing surface 304 of armature 140 and forming surface 198 of second fixed portion 196.

Solenoid base 190 is also made of a ferromagnetic material and has generally cylindrical external surface 214 and exterior internal bore 211. Exterior internal bore 211 of solenoid base 190 has internal threads that correspond to threads 202 to enable a threading engagement between valve base 210 and solenoid base 190. The threaded end of exterior interior bore 211 of solenoid base 190 further opens into bore 212 that enables a seal-tight engagement between valve base 210 and solenoid base 190 due to the presence of sealing member 174 in groove 204. Solenoid base 190 further has smaller interior bore 603 that is concentric to interior bore 211 continuous with thin radial portion 640 that is connected to ring portion 213. The interior bore of ring portion 213 is configured to threadably receive magnetic pole piece 130 and engage sealing member 172 between exterior portion or proximate end 132 of magnetic pole piece 130 and the interior of solenoid base 190. One of ordinary skill in the art will recognize other means of attaching solenoid base 190 to valve base 210 can be employed such that a tight seal therebetween is created, including, but not limited to welding and using an epoxy. Furthermore, solenoid base 190 and valve base 120 can be made of one contiguous piece, thus eliminating the need for a seal-tight engagement and sealing member 174. In addition, the one-piece construction is particularly useful in high-pressure systems. However, solenoid base 190 could be made of two elements, but would require a sealing member between the two elements.

Distal end 131 of magnetic pole piece 130 is comprised of a generally cylindrically configured and solid ferromagnetic element, that is sized to fit within and is generally coaxial with axis A of generally cylindrical bore 621 of solenoid coil 120, that is installed within housing 110. Housing may be provided with a sidewall aperture (not shown) for leads that supply electrical connection between solenoid coil 120 and a current control source (also not shown). Distal end 131 of magnetic pole piece 130 has distal surface 612 that is axially spaced apart from and is magnetically coupled to generally circular top surface 180 of armature 140 so as to form an axial air gap 565 therebetween. Distal end 131, in the embodiment shown, further consists of cavity 215 that receives one end of biasing member 150. The other end of biasing member 150 engages top surface 180 of armature 147. The shapes of magnetic pole piece 130 and armature 140 could be reversed such that as armature 140 axially translates, it fits into a recess within distal end 131 of pole piece 130. Distal end 131 of magnetic pole piece 130 would then have a ferrule-shaped portion, tapered or otherwise.

In this embodiment, biasing member 150 is a compression spring. Biasing member 150 maximizes the axial distance between armature 140 and distal end 131 of magnetic pole piece 130 when solenoid coil 120 is de-energized, and provides the force that must be overcome when solenoid coil 120 is subject to an electric current. The compression spring is one embodiment of a biasing mechanism. The biasing mechanism could also be a biasing member in the form of a flexible tube, a star spring with a memory, a sponge, a geo spring, or combinations thereof. Furthermore, the biasing mechanism could also be fluid pressure, gravity, or any other means for biasing armature 140 away from magnetic pole piece 130.

In addition, instead of placing biasing member 150 within cavity 215 of magnetic pole piece 130, magnetic pole piece 130 could contain a bore therethrough (not shown), with the biasing mechanism disposed substantially within the bore or at distal end 131 of magnetic pole piece 130, a biasing member (of those provided supra or other, not shown) within the bore, and an armature-biasing axial pin (not shown) functionally engaging biasing member 150 on one end and armature 140 on the other end. Furthermore, the biasing mechanism could further include a screw set (not shown) disposed on proximate end 132 of magnetic pole piece 130 and functionally engaging the armature-biasing axial pin within the bore of magnetic pole piece 130 to adjust a tension of said armature-biasing axial pin. An embodiment of the biasing mechanism that includes the armature-biasing axial pin and screw set within the magnetic pole piece bore would then further include at least one fluid sealing member between magnetic pole piece 130 and the screw set. One example of the fluid sealing member is an O-ring.

In the embodiment shown in FIG. 1, armature 140 extends through generally cylindrical inner bore 603 of solenoid base 190, so that exterior cylindrical surface 160 of armature 140 is slightly spaced apart from interior cylindrical surface 208 of solenoid bore 190 and thereby forms gap 605 therebetween. Armature 140 terminates at a top generally circular surface 180 thereof adjacent to longitudinal or distal end 131 of magnetic pole piece 130. Annular ring portion 147 of armature 140 extends substantially over and around fixed portion 195 of valve base 210. Interior bore 207 of armature 140 is sized to fit and be axially movable over sealing member 301.

As the fluid enters valve assembly 1 through inlet port 220 and enters valve chamber 305 by way df bore 222 therebetween. As shown in FIG. 1, armature 140 is biased in the closed position by biasing member 150. Sealing surface 304 of armature 140 forms a flow stoppable contact, i.e., a fluid seal junction, with sealing member 303 of valve base 210. Interior fluid cavity 148 is thus formed between armature 140 and first fixed portion 195 of valve base 210. When fluid enters valve assembly 1 and surrounds armature 140, it passes through aperture 142 and into interior fluid cavity 148 to exert an upward force on disc-shaped portion 143 of armature 140.

When solenoid coil 120 is energized, armature 140 is magnetically attracted to magnetic pole piece 130, pushing against biasing member 150. This axially moves sealing surface 304 of armature 140 away from sealing member 303 disposed on second fixed portion 196 of valve base 210, thus allowing fluid to flow between valve chamber 305 and connecting bore 302 and out of valve assembly 1 via fluid exit port 230. This establishes flow from inlet port 220 to exit port 230 through bore 222, chamber 305, and bore 302. One of ordinary skill in the art will realize that the positioning of fluid exit port 230 is non-limiting in that fluid exit port 230 could be disposed on bottom surface 232 of valve base 210

The effective sealing diameter of surface 304 is kept very near the sealing diameter of sealing member 301 in order to keep the pressure forces acting on armature 140 as nearly balanced as possible. That is, the fluid pressure acting downwardly on armature 140 at top surface 180 and upwardly at angular portion 209 and at disc-shaped portion 143 of armature by the fluid within interior fluid cavity 148 are essentially equal. Thus, the only forces exerted on armature 140 are of biasing member 150 and the electromagnetic force. In the absence of this balancing design, in high pressure systems, the pressure forces exerted on armature 140 can be of such high magnitude, that the power required to actuate valve assembly 1 would be unacceptable. This design also allows the valve to be independent of varying fluid operating pressures which would otherwise make operation of valve assembly 1 less predictable and more inconsistent.

Figure 2:
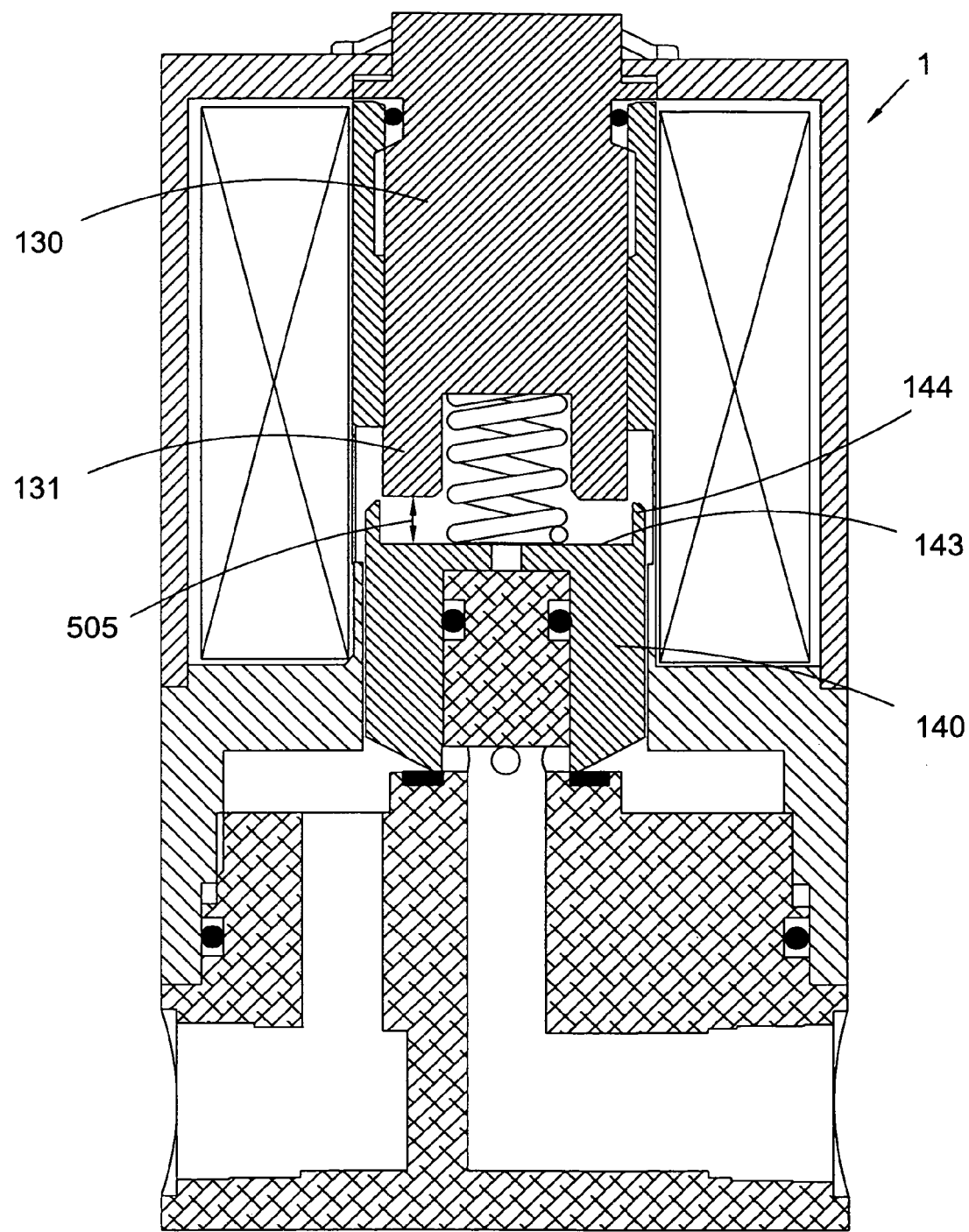
FIG. 2 shows one alternate embodiment of the armature of the valve assembly.

FIG. 2 shows an alternate embodiment of armature 140 in which ferrule-shaped portion 144 disposed on said disc-shaped portion 143 of armature 140 can be appreciated. Armature 140 and ferrule-shaped portion 144 can be separate pieces mechanically connected to one another or made as a single element. Ferrule-shaped portion 144 has an inner diameter slightly larger than the diameter of distal end 131 of magnetic pole piece such that magnetic pole piece 130 fits within ferrule-shaped portion 144 upon axial translation of armature 140, forming a radial gap (not shown because valve assembly 1 is shown in the de-energized state) and axial air gap 565 therebetween.

In this embodiment, in which there is both axial air gap 565 and a radial air gap (see 566 of FIG. 3) between armature 140 and magnetic pole piece 130. The radial air gap, a path of low reluctance, shunts a portion of the magnetic flux that normally passes across axial air gap 565, a path of relatively high reluctance. Thus, axial air gap 565 does not effectively contribute to the magnetic flux path. The result is an effective linearization of the force versus air gap characteristic over a prescribed range, irrespective of the relative axial separation between armature 140 and magnetic pole piece 130. As stated supra, the position of the ferrule-shaped portion could be on magnetic pole piece 130 such that armature 140 fits within the ferrule-shaped portion upon axial translation.

Figure 3:
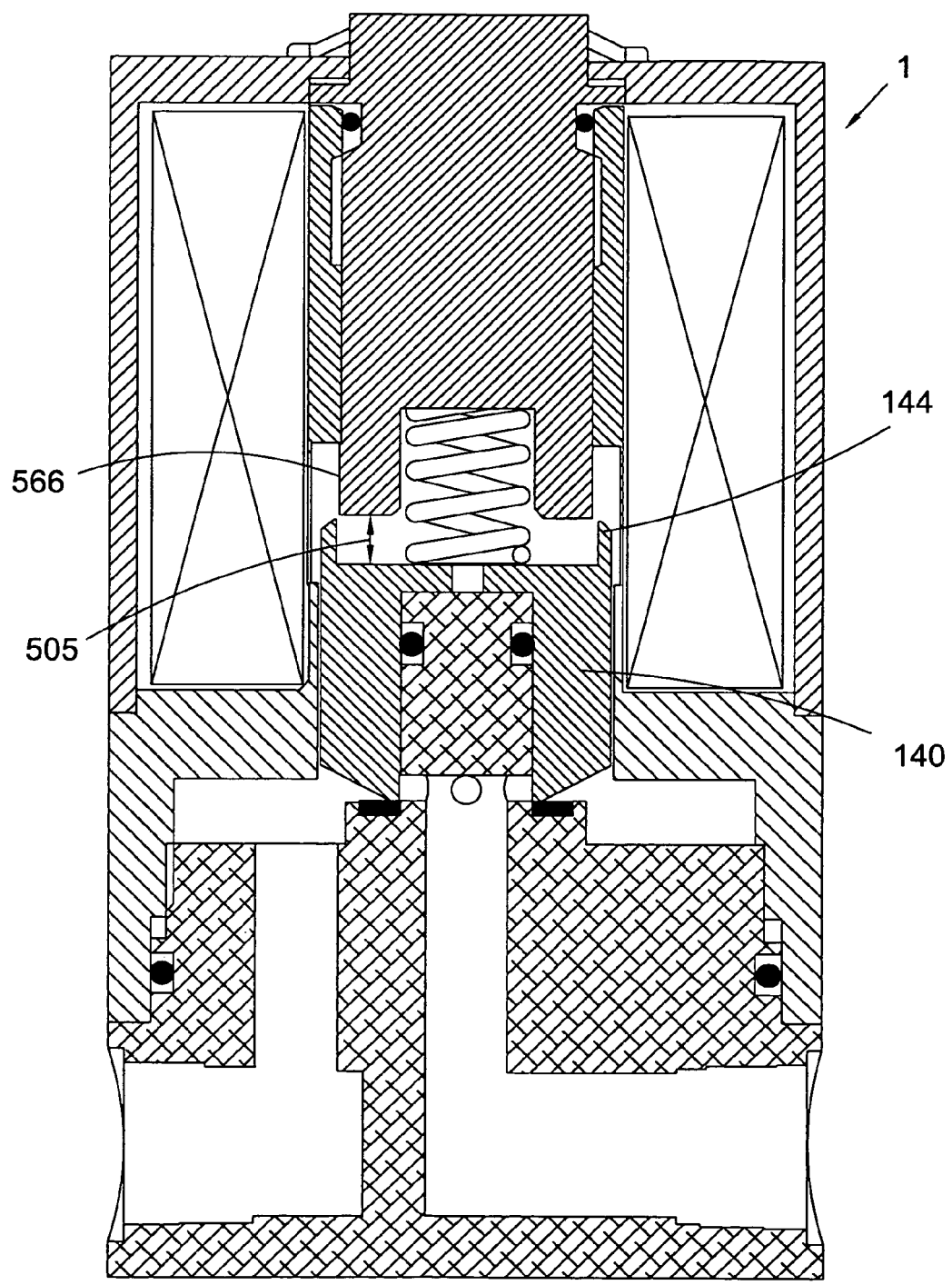
FIG. 3 shows a further alternate embodiment of the armature of the valve assembly.

FIG. 3 shows an alternate embodiment of armature 140, in which armature 140 includes a tapered ferrule-shaped portion 144. That ferrule-shaped portion 144 of armature 140 is tapered, or has a varying thickness in the axial direction, causes this portion of armature 140 to become immediately saturated in the course of its diverting magnetic flux that would otherwise pass across axial gap 565, minimizing hysteresis.

Valve assembly 1 is also shown in FIG. 3 as being in the energized and open state so that radial air gap 566 (as described with respect to the embodiment shown in FIG. 2) can be appreciated.

Figure 4:
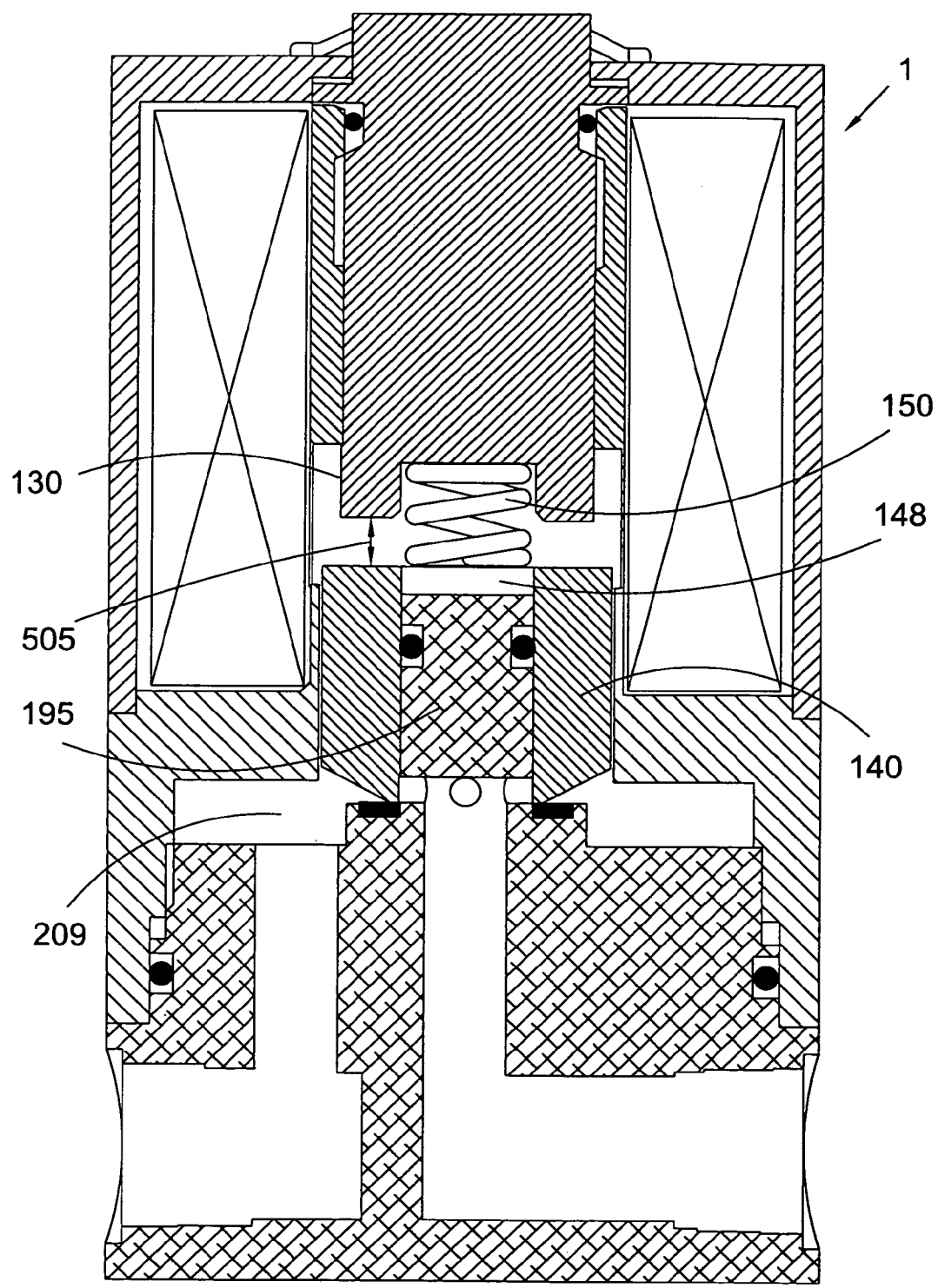
FIG. 4 shows yet another alternate embodiment of the armature of the valve assembly.

FIG. 4 shows an alternate embodiment of armature 140 in which interior fluid cavity 148 is as wide as interior bore 207 such that the downward fluid pressure exerted by the fluid on armature 140 is a function of the surface area of top surface 180 and the upward force on armature is a function of the surface area of angular portion 209. The surface areas are as close to one another as possible such that the fluid pressure is equilibrated and the only forces acting on armature 140 are that of biasing member 150 and the electromagnetic force of magnetic pole piece 130 when energized.

FIG. 5 shows that portion of the valve assembly 1 enlarged in FIGS. 5a, 5b, and 5c, which each show an alternate embodiment of the fluid seal junction between sealing surface 304 of armature 140 and second fixed portion 196 of solenoid base 190. FIG. 5a shows an embodiment of fluid seal junction in which second fixed portion 196 does not include sealing member 303, but sealing surface 304 of annular ring 147 of armature 140 abuts second fixed portion 196 adjacently.

FIG. 5b shows an alternate embodiment of the fluid seal junction in which second fixed portion 196 includes sealing member 303 and sealing surface 304 of annular ring 147 of armature 140 adjacently meet.

FIG. 5c shows a third alternate embodiment of the fluid seal junction in which second fixed portion 196 does not include a sealing member, but does include a second step such that sealing surface 304 of annular ring 147 of armature 140 does not meet surface 198 of second fixed portion 196 of valve base 210, but abuts an outer surface of third fixed portion 194 further protruding from second fixed portion 196 on solenoid base 190. One of ordinary skill in the art will recognize, however, that any fluid seal junction in which the passage of fluid between interior valve cavity 305 and bore 302 can be prevented until armature 140 axially translates towards magnetic pole piece 130 can be used.

Although, for convenience, the invention has been described primarily with reference to several specific embodiments, it will be apparent to those of ordinary skill in the art that the valve and the components thereof can be modified without departing from the spirit and scope of the invention as claimed.

What is claimed is:

1. A device comprised of:
a valve portion comprised of a valve base, said valve base defining a fluid inlet port, a fluid exit port, and a first fixed portion, said first fixed portion having a generally radial aperture connecting said fluid inlet port to said fluid exit port; and
a solenoid portion functionally engaging said valve portion and comprised of:
a coil having a coil bore therethrough, and being operative to produce a magnetic field when subject to an electric signal;
a magnetic pole piece disposed substantially within said coil bore and having a distal end and a proximate end;
an axially translatable armature, said armature positioned substantially on said first fixed portion of said valve base and comprised of a generally disc-shaped portion, an armature aperture disposed on said disc-shaped portion, and an annular ring portion fitting substantially around said first fixed portion, wherein said armature aperture and said first fixed portion of said valve base form a fluid cavity therebetween, and wherein said armature aperture allows a fluid to pass through said armature aperture into said fluid cavity and substantially equilibrate an axial force on said armature created by said fluid, said armature forming an axial air gap between said distal end of said magnetic pole piece and said disc-shaped portion of said armature and a fluid seal junction with said valve base;
wherein said distal end of said magnetic pole piece includes a ferrule-shaped portion, said ferrule shaped portion having an inner diameter slightly larger than a diameter of said distal end of said magnetic pole piece such that the magnetic pole piece fits within said ferrule-shaped portion of said magnetic pole piece upon axial translation of said armature, forming a radial gap therebetween, said ferrule-shaped portion shunting a portion of a magnetic flux between said magnetic pole piece and said armature;
a solenoid base, said solenoid base disposed substantially within said coil bore and extending into said valve portion, wherein said solenoid base forms a fluid chamber substantially around said armature;
a biasing mechanism functionally engaging said magnetic pole piece and said armature and adapted to exert a biasing force on said armature in a direction away from said magnetic pole piece;
wherein said armature axially translates in response to said electric signal to establish fluid flow from said fluid inlet port to said fluid exit port across said fluid seal junction and through said radial aperture of said first fixed portion.

2. The device of claim 1, wherein said ferrule-shaped portion of said pole piece is tapered.

3. The device of claim 1, wherein said armature further includes a ferrule-shaped portion disposed on said disc-shaped portion, said ferrule-shaped portion having an inner diameter slightly larger than a diameter of said distal end of said magnetic pole piece such that said magnetic pole piece fits within said ferrule-shaped portion upon axial translation of said armature, forming a radial gap therebetween, said ferrule-shaped portion shunting a portion of a magnetic flux between said armature and said magnetic pole piece.

4. The device of claim 3, wherein said ferrule-shaped portion of said armature is tapered.

5. The device of claim 1, wherein said magnetic pole piece and said armature are made of a ferromagnetic material.

6. The device of claim 1, wherein said solenoid base, said first fixed portion, and said valve base are made of a non-ferromagnetic material.

7. The device of claim 1, wherein said device further includes at least one fluid sealing member between said solenoid base and said magnetic pole piece to prevent said fluid from escaping said fluid chamber, said at least one fluid sealing member being an O-ring.

8. The device of claim 1, wherein said device further includes at least one fluid sealing member between said solenoid base and said valve base to prevent said fluid from escaping said fluid chamber, said at least one fluid sealing member being an O-ring.

9. The device of claim 1, wherein said device further includes a housing substantially enclosing said magnetic pole piece, said biasing mechanism, said solenoid base and said coil, said housing being made of a ferromagnetic material.

10. The device of claim 1, wherein said valve base is further comprised of a second fixed portion and a sealing member disposed thereon, and said annular ring portion of said armature is further comprised of an angular portion, a portion of said angular portion of said armature abutting said sealing member to prevent fluid flow across said fluid seal junction when said device is in a de-energized state.

11. A valve assembly comprised of:
a valve portion comprised of a valve base, said valve base defining a fluid inlet port, a fluid exit port, and a first fixed portion, said first fixed portion having a generally radial aperture connecting said fluid inlet port to said fluid exit port; and
a solenoid portion functionally engaging said valve portion and comprised of:
  a coil having a coil bore therethrough, and being operative to produce a magnetic field when subject to an electric signal;
  a magnetic pole piece disposed substantially within said coil bore and having a distal end and a proximate end;
  an axially translatable armature, said armature positioned substantially on said first fixed portion of said valve base and comprised of a generally disc-shaped portion, an armature aperture disposed on said disc-shaped portion, and an annular ring portion fitting substantially around said first fixed portion, wherein said armature aperture and said first fixed portion of said valve base form a fluid cavity therebetween, and wherein said armature aperture allows a fluid to pass through said armature aperture into said fluid cavity and substantially equilibrate an axial force on said armature created by said fluid, said armature forming an axial air gap between said distal end of said magnetic pole piece and said disc-shaped portion of said armature and a fluid seal junction with said valve base, and wherein said armature further includes a ferrule-shaped portion disposed on said disc-shaped portion, said ferrule-shaped portion having an inner diameter slightly larger than a diameter of said distal end of said magnetic pole piece such that said magnetic pole piece fits within said ferrule-shaped portion upon axial translation of said armature, forming a radial gap therebetween, said ferrule-shaped portion shunting a portion of a magnetic flux between said armature and said magnetic pole piece;
  a solenoid base, said solenoid base disposed substantially within said coil bore and extending into said valve portion, wherein said solenoid base forms a fluid chamber substantially around said armature;
  a biasing mechanism functionally engaging said magnetic pole piece and said armature and adapted to exert a biasing force on said armature in a direction away from said magnetic pole piece;
wherein said armature axially translates in response to said electric signal to establish fluid flow from said fluid inlet port to said fluid exit port across said fluid seal junction and through said radial aperture of said first fixed portion.

12. The valve assembly of claim 11, wherein said ferrule-shaped portion of said armature is tapered.

13. The valve assembly of claim 11, wherein said magnetic pole piece and said armature are made of a ferromagnetic material.

14. The valve assembly of claim 11, wherein said solenoid base, said first fixed portion, and said valve base are made of a non-ferromagnetic material.

15. The valve assembly of claim 11, wherein said device further includes at least one fluid sealing member between said solenoid base and said magnetic pole piece to prevent said fluid from escaping said fluid chamber, said at least one fluid sealing member being an O-ring.

16. The valve assembly of claim 11, wherein said device further includes at least one fluid sealing member between said solenoid base and said valve base to prevent said fluid from escaping said fluid chamber, said at least one fluid sealing member being an O-ring.

17. The valve assembly of claim 11, wherein said device further includes a housing substantially enclosing said magnetic pole piece, said biasing mechanism, said solenoid base and said coil, said housing being made of a ferromagnetic material.

18. The valve assembly of claim 11, wherein said valve base is further comprised of a second fixed portion and a sealing member disposed thereon, and said annular ring portion of said armature is further comprised of an angular portion, a portion of said angular portion of said armature abutting said sealing member to prevent fluid flow across said fluid seal junction when said device is in a de-energized state.

19. A device comprised of:
a valve portion comprised of a valve base, said valve base defining a fluid inlet port, a fluid exit port, and a first fixed portion, a second fixed portion with a sealing member disposed thereon, said first fixed portion having a generally radial aperture connecting said fluid inlet port to said fluid exit port; and
a solenoid portion functionally engaging said valve portion and comprised of:
  a coil having a coil bore therethrough, and being operative to produce a magnetic field when subject to an electric signal;
  a magnetic pole piece disposed substantially within said coil bore and having a distal end and a proximate end;
  an axially translatable armature, said armature positioned substantially on said first fixed portion of said valve base and comprised of a generally disc-shaped portion, an armature aperture disposed on said disc-shaped portion, and an annular ring portion with an angular portion, said annular ring portion fitting substantially around said first fixed portion, wherein said armature aperture and said first fixed portion of said valve base form a fluid cavity therebetween, and wherein said armature aperture allows a fluid to pass through said armature aperture into said fluid cavity and substantially equilibrate an axial force on said armature created by said fluid, said armature forming an axial air gap between said distal end of said magnetic pole piece and said disc-shaped portion of said armature and a fluid seal junction with said sealing member of said second fixed portion of said valve base, and wherein said armature further includes a ferrule-shaped portion disposed on said disc-shaped portion, said ferrule-shaped portion having an inner diameter slightly larger than a diameter of said distal end of said magnetic pole piece such that said magnetic pole piece fits within said ferrule-shaped portion upon axial translation of said armature, forming a radial gap therebetween, said ferrule-shaped portion shunting a portion of a magnetic flux between said armature and said magnetic pole piece;

a solenoid base, said solenoid base disposed substantially within said coil bore and extending into said valve portion, wherein said solenoid base forms a fluid chamber substantially around said armature;

a biasing mechanism functionally engaging said magnetic pole piece and said armature and adapted to exert a biasing force on said armature in a direction away from said magnetic pole piece;

wherein said angular portion of said annular ring portion of said armature abuts said sealing member of said second fixed portion of said valve base to form said fluid seal junction, and wherein said armature axially translates in response to said electric signal to establish fluid flow from said fluid inlet port to said fluid exit port across said fluid seal junction and through said radial aperture of said first fixed portion.

20. The device of claim 19, wherein said ferrule-shaped portion of said armature is tapered.

21. The device of claim 19, wherein said magnetic pole piece and said armature are made of a ferromagnetic material.

22. The device of claim 19, wherein said solenoid base, said first fixed portion, and said valve base are made of a non-ferromagnetic material.

23. The device of claim 19, wherein said device further includes at least one fluid sealing member between said solenoid base and said magnetic pole piece to prevent said fluid from escaping said fluid chamber, said at least one fluid sealing member being an O-ring.

24. The device of claim 19, wherein said device further includes at least one fluid sealing member between said solenoid base and said valve base to prevent said fluid from escaping said fluid chamber, said at least one fluid sealing member being an O-ring.

25. The device of claim 19, wherein said device further includes a housing substantially enclosing said magnetic pole piece, said biasing mechanism, said solenoid base and said coil, said housing being made of a ferromagnetic material.

* * * * *